(12) United States Patent
Chang

(10) Patent No.: US 8,248,763 B2
(45) Date of Patent: Aug. 21, 2012

(54) PORTABLE ELECTRONIC DEVICE WITH STAMP STRUCTURE

(75) Inventor: Cheng-Lung Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 303 days.

(21) Appl. No.: 12/578,186

(22) Filed: Oct. 13, 2009

(65) Prior Publication Data

US 2010/0265637 A1    Oct. 21, 2010

(30) Foreign Application Priority Data

Apr. 17, 2009    (CN) .......................... 2009 1 0301636

(51) Int. Cl.
*H05K 7/14*    (2006.01)

(52) U.S. Cl. ............... 361/679.01; 361/679.55; 101/333

(58) Field of Classification Search ............ 361/679.01–679.61; 101/405, 395, 333
See application file for complete search history.

(56) References Cited

U.S. PATENT DOCUMENTS

| | | | | |
|---|---|---|---|---|
| 6,189,451 B1 * | 2/2001 | Pichler | ......................... | 101/333 |
| 6,231,225 B1 * | 5/2001 | Bedol | ......................... | 708/106 |
| 6,813,999 B2 * | 11/2004 | Treml | ......................... | 101/104 |
| 6,925,933 B1 * | 8/2005 | Shih | ............................. | 101/333 |
| 7,077,063 B2 * | 7/2006 | Petersen | ....................... | 101/333 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A portable electronic device includes a main body and a stamp structure. The main body defines a through hole. The stamp structure includes a seat and a stamp. The seat includes a main plate and an end plate. The main plate defines a containing groove for receiving the stamp. The seat is detachably attached to the main body, and the end plate covers the through hole.

10 Claims, 4 Drawing Sheets

PORTABLE ELECTRONIC DEVICE WITH STAMP STRUCTURE

BACKGROUND

1. Technical Field

The present disclosure relates to portable electronic devices, particularly, to a portable electronic device with a stamp therein.

2. Description of Related Art

Potable electronic devices such as mobile phones, personal digital assistants, etc., are widely used. Generally, users carry the portable electronic devices everywhere at all time for easy communicating with others. Some users usually imprint their names or designs on papers with stamps. However, it is easy to forget carrying the stamp or misplace the stamp. Thus, a portable electronic device with a stamp therein appears. The stamp is positioned at one end of the portable electronic device, and a cover is used to protect the stamp. This may increase volume of the portable electronic device and cost of manufacturing the portable electronic device.

Therefore, there is room for improvement within the art.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the portable electronic device, in which.

DETAILED DESCRIPTION OF THE EMBODIMENTS

Figure 1:
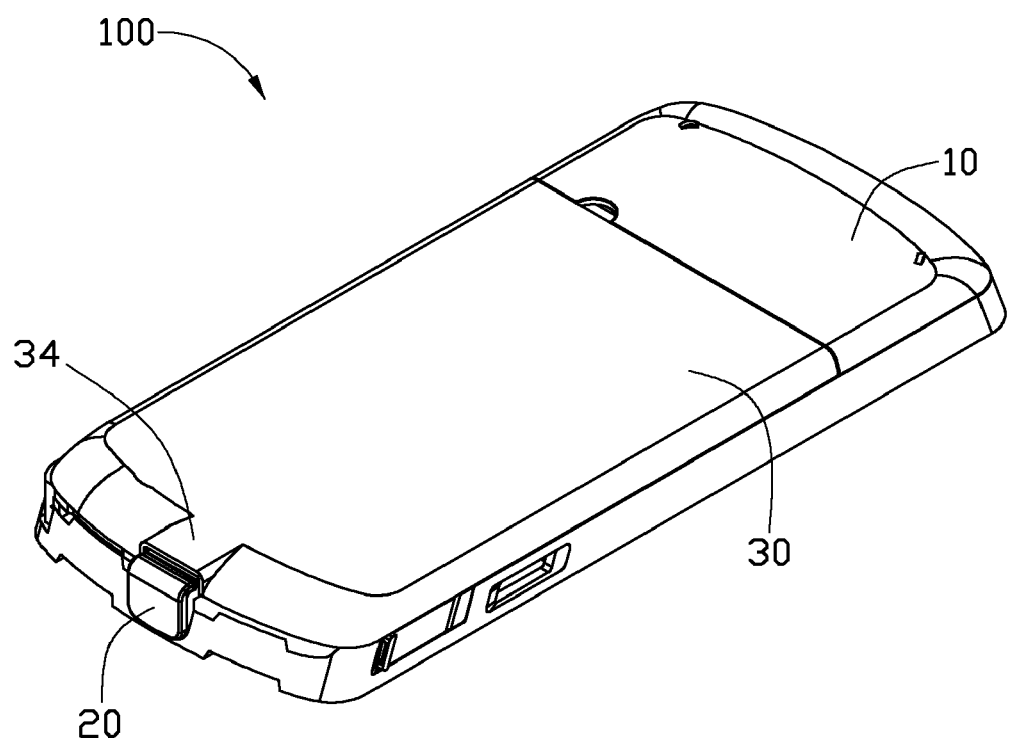
FIG. 1 is an assembled, schematic view of a portable electronic device in accordance with an exemplary embodiment, the portable electronic device including a main body and a stamp structure.
Figure 2:
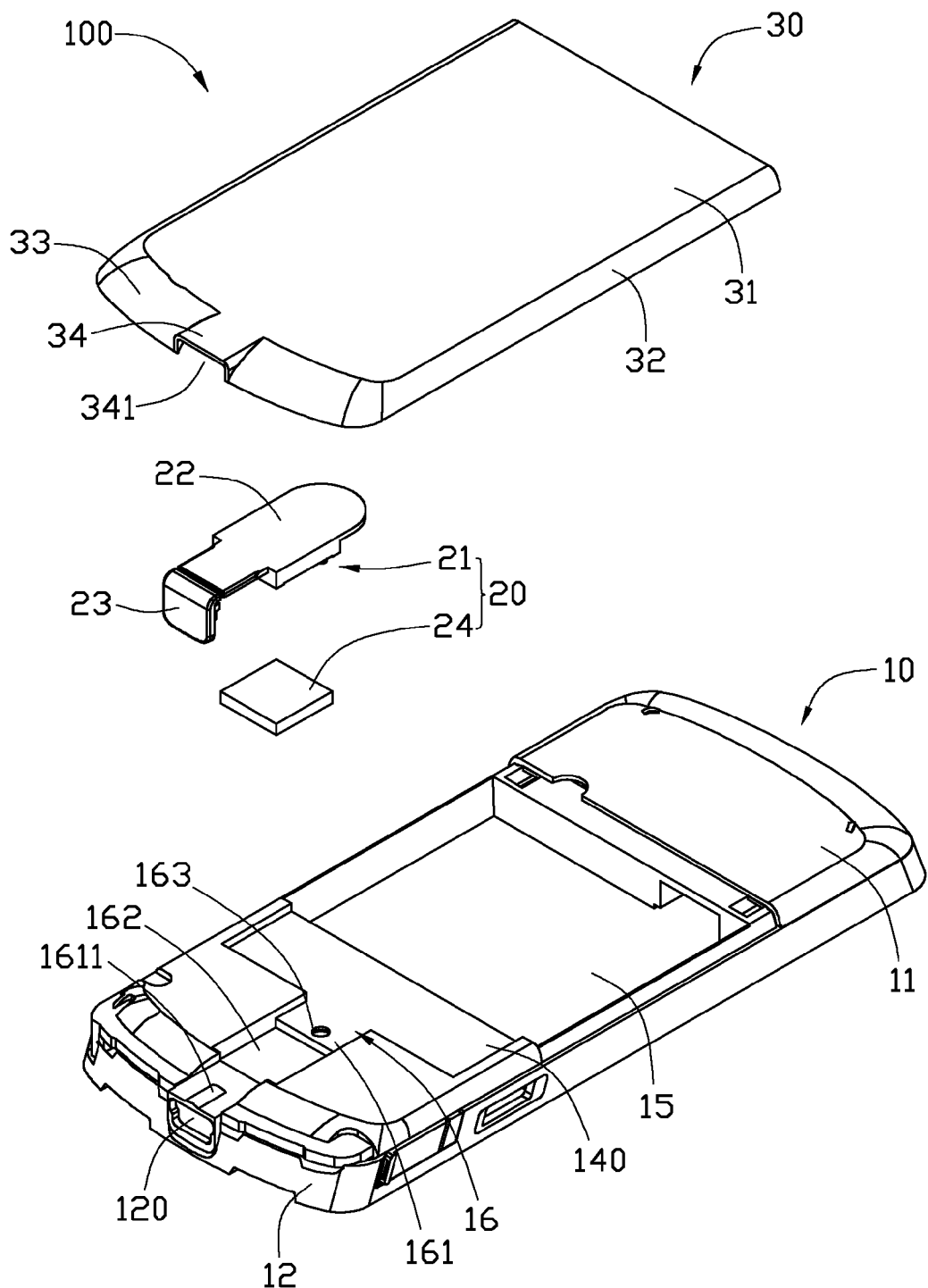
FIG. 2 is an exploded, schematic view of the portable electronic device shown in FIG. 1.

FIGS. 1-2 shows a portable electronic device 100 in accordance with an exemplary embodiment. The portable electronic device 100 includes a main body 10, a stamp structure 20 and a cover 30.

The main body 10 includes a top surface 11 and an end wall 12. The top surface 11 defines a cavity 15 at a middle portion for receiving a battery (not shown). The end wall 12 defines a through hole 120, and a connector (not shown) is set in the opening. A recessed portion 140 is formed in the top surface 11 adjacent to the cavity 15. The recessed portion 140 includes a longitudinal section 16 extending to the end wall 12. The longitudinal section 16 includes a bottom surface 161, and a receiving groove 162 is defined in the bottom surface 161. A stepped hole 163 and a protrusion 1611 are positioned at two sides of the receiving groove 162. The protrusion 1611 has an arcuate cross section. The through hole 120 is beneath the protrusion 1611.

Figure 3:
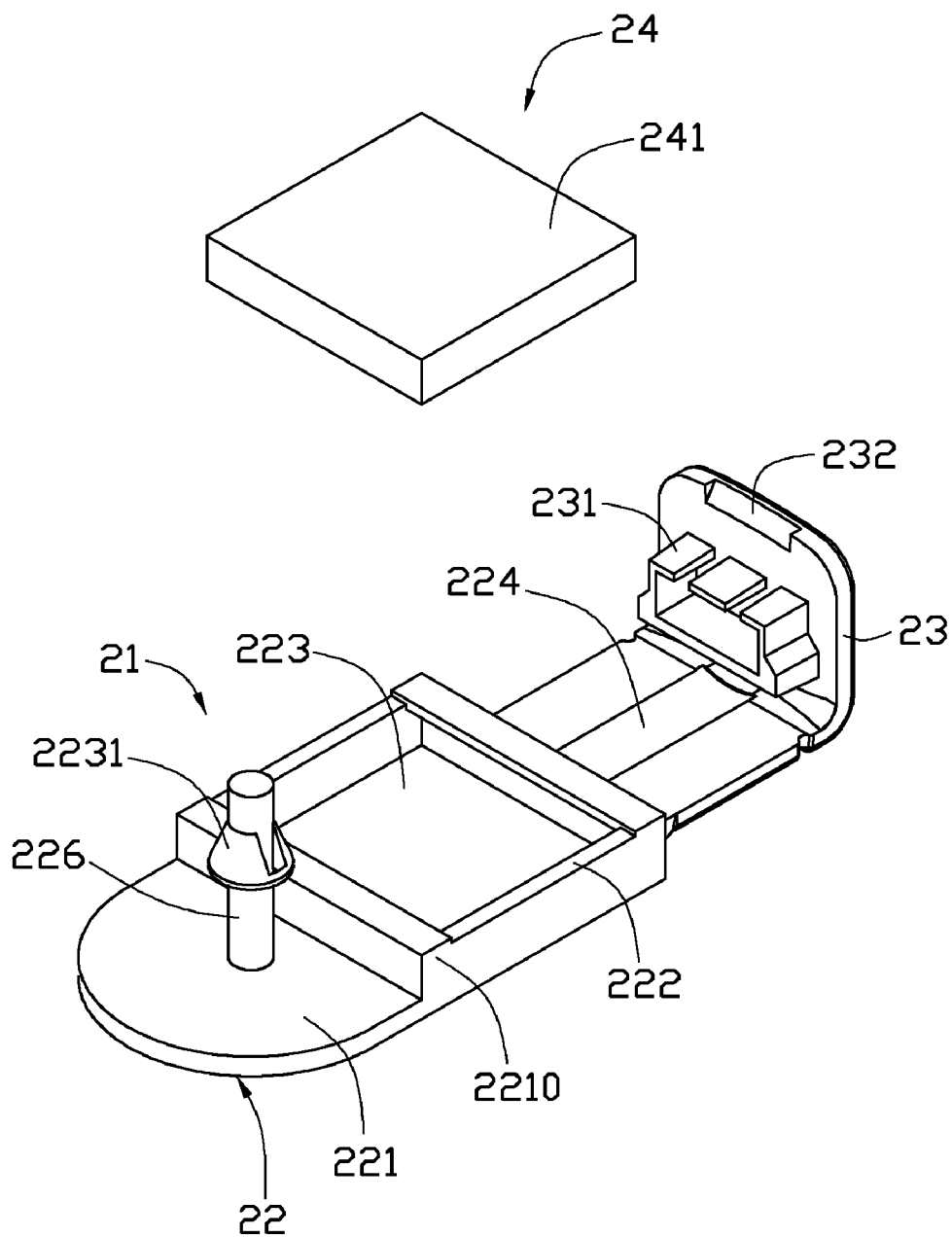
FIG. 3 is an enlarged, schematic view of the stamp structure shown in FIG. 2 from another aspect
Figure 4:
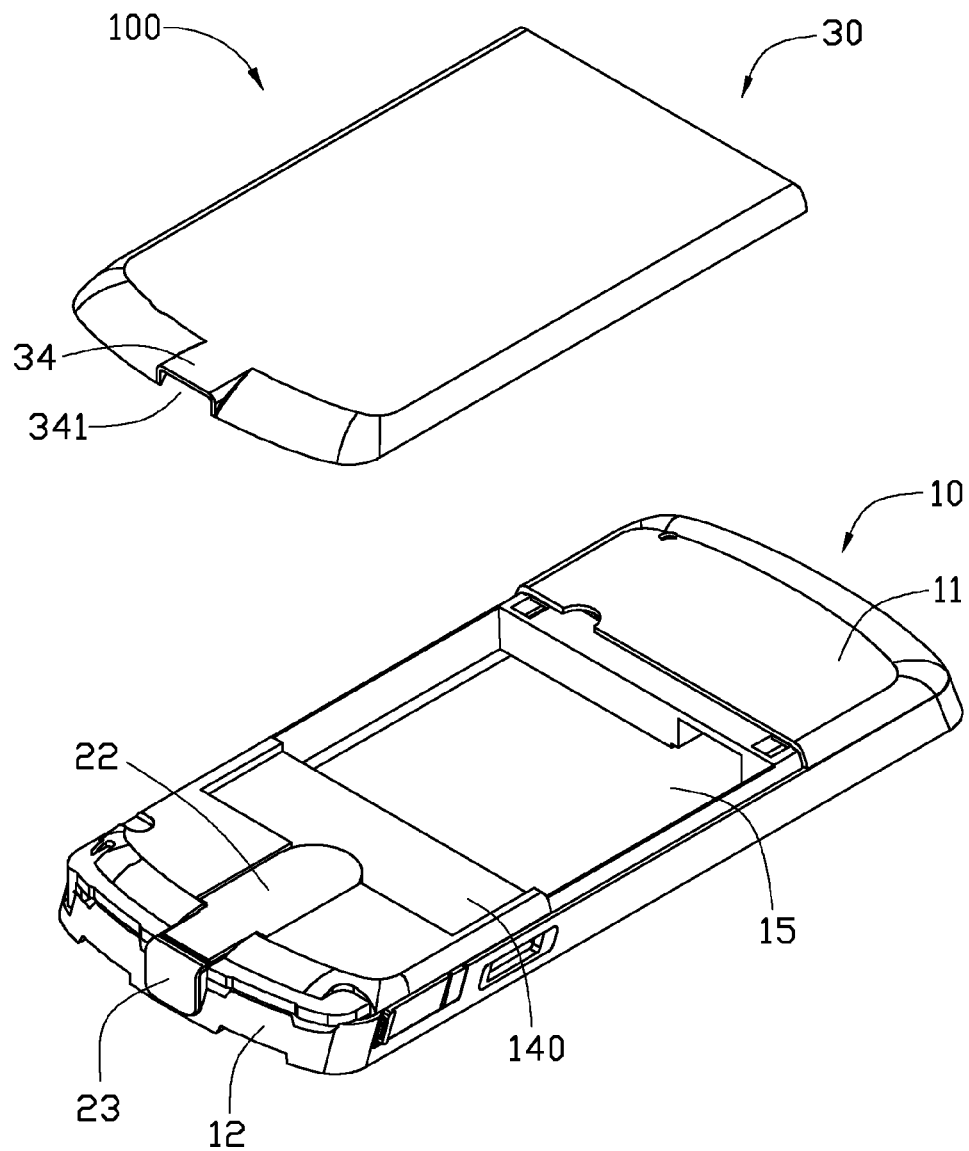
FIG. 4 is similar to FIG. 2, but showing the stamp structure attached to the main body.

Referring to FIG. 3, the stamp structure 20 includes a seat 21 and a stamp 24. The seat 21 is made of rubber, and includes a main plate 22 and an end plate 23 vertically extending from one end of the main plate 22. The end plate 23 is integrally formed with the main plate 22. The main plate 22 includes an inner surface 221, and a holding portion 222 is formed at a middle portion of the inner surface 221. The holding portion 222 is engagable in the receiving groove 162 of the main body 10. The holding portion 222 defines a containing groove 223 for receiving the stamp 24. A latching portion 226 is positioned at the other end of the main plate 22, for being locked in the stepped hole 163 of the main body 10 so as to fix the stamp structure 20 to the main body 10. The main plate 22 has a slot 224 longitudinally defined between the holding portion 222 and the end plate 23, for receiving the protrusion 1611 of the main body 10.

The end plate 23 includes a seal portion 231 corresponding to the through hole 120 of the main body 10, and defines a cutout at one end thereof for easily raising the seat 21. The seal 231 extends toward the latching portion 226, and is configured for engaged in the through hole 120 so as to protect the connector in the through hole 120. The seal 231 is made of rubber and is divided into several segments to be easily inserted into the through hole 120.

The stamp 24 includes a surface 241 with letters or design thereon (not shown). The letters or design may be carved by users or formed in mold.

The cover 30 includes a retaining portion 34 formed at one end thereof. The retaining portion 34 defines a retaining groove 341 for engaging with the main plate 22. The cover 30 covers the cavity 15 and the recessed portion 140 when attached to the main body 10.

In assembly of the stamp structure 20 to the main body 10, the stamp 24 is firstly received in the containing groove 223, with the letters or design being exposed. The latching portion 226 is then engaged in the stepped hole 163 of the main body 10. The holding portion 222 is received in the receiving groove 162, and the protrusion 1611 is engaged in the slot 224. The seal 231 is then inserted into the through hole 120 so as to protect the connector behind the through hole 120.

In use, the stamp structure 20 is pushed up via the cutout 232 of the end plate 23, and the latching portion 226 is then disengaged from the stepped hole 163 so that the stamp structure 20 is detached from the main body 10 for allowing user to freely use the stamp 24.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising: a main body including an end wall and a top surface connected to each other, the end wall defining a through hole, a recessed portion formed in the top surface; and a stamp structure including a seat and a stamp, the seat including a main plate and an end plate, the main plate defining a containing groove for receiving the stamp, the seat being detachably attached to the recessed portion of the main body, and the end plate abutting against the end wall and covering the through hole; and a cover detachably attached to the main body, the cover defining an engaging groove for allowing the main plate of the seat to extend through, wherein the recessed includes a bottom surface, the main plate includes a holding portion which defines the containing groove, and the recessed portion defines a receiving groove in the bottom surface for receiving the holding portion, wherein the end plate is integrally formed with the main plate and vertically extends from one end of the main plate, and the holding portion is positioned between the end plate and the latching portion.

2. The portable electronic device as claimed in claim 1, wherein the seat defines a slot between the holding portion and the end plate, a protrusion is formed at the bottom surface of the recessed portion, and the protrusion is engaged in the slot.

3. The portable electronic device as claimed in claim 1, wherein the end plate comprises a seal inserted in the through hole.

4. The portable electronic device as claimed in claim 3, wherein the end plate defines a cutout at one end thereof far away from the main plate.

5. A portable electronic device comprising: a main body defining a recessed portion at an end portion thereof, the recessed portion including a bottom surface and defining a stepped hole in the bottom surface; a seat including a main plate and an end plate, the main plate including a holding portion which defines a containing groove, a receiving groove defined in the bottom surface for receiving the holding portion, the seat being detachably attached to the main body, the end plate vertically extending from one end of the main plate, and the main plate received in the recessed portion, the main plate further comprising a latching portion far away from the end plate, and the latching portion detachably engaged in the stepped hole; and a stamp received in the containing groove of the seat, wherein the seat defines a slot between the holding portion and the end plate, a protrusion is formed at the bottom surface of the recessed portion, and the protrusion is engaged in the slot.

6. The portable electronic device as claimed in claim 5, wherein the main body includes an end wall, the end wall defines a through hole, the recessed portion extends to the end wall and is under the through hole, and the end plate of the seat covers the through hole.

7. The portable electronic device as claimed in claim 6, wherein the end plate comprises a seal inserted in the through hole.

8. The portable electronic device as claimed in claim 7, wherein the end plate defines a cutout at one end thereof far away from the main plate.

9. The portable electronic device as claimed in claim 5, wherein the end plate is integrally formed with the main plate.

10. The portable electronic device as claimed in claim 5, further comprises a cover detachably attached to the main body, the cover defines an engaging groove for allowing the main plate of the seat to extend through.

* * * * *